US007542990B2

(12) United States Patent
Paval

(10) Patent No.: US 7,542,990 B2
(45) Date of Patent: Jun. 2, 2009

(54) SYSTEM AND METHOD FOR PROVIDING A RELATIONAL APPLICATION DOMAIN MODEL

(75) Inventor: Eugen Paval, Ronkonkoma, NY (US)

(73) Assignee: Computer Associates Think, Inc., Islandia, NY (US)

( * ) Notice: Subject to any disclaimer, the term of this patent is extended or adjusted under 35 U.S.C. 154(b) by 406 days.

(21) Appl. No.: 10/974,510

(22) Filed: Oct. 26, 2004

(65) Prior Publication Data

US 2006/0089945 A1   Apr. 27, 2006

(51) Int. Cl.
*G06F 17/00* (2006.01)
(52) U.S. Cl. .......................... 707/103; 707/3; 707/100; 707/101; 707/102; 707/103 R
(58) Field of Classification Search ........................ None
See application file for complete search history.

(56) References Cited

U.S. PATENT DOCUMENTS

| | | | | |
|---|---|---|---|---|
| 5,504,885 | A * | 4/1996 | Alashqur | 717/141 |
| 6,263,342 | B1 * | 7/2001 | Chang et al. | 707/103 R |
| 6,272,488 | B1 * | 8/2001 | Chang et al. | 707/4 |
| 6,418,448 | B1 * | 7/2002 | Sarkar | 707/104.1 |
| 6,470,354 | B1 | 10/2002 | Aldridge et al. | |
| 6,571,252 | B1 | 5/2003 | Mukherjee | |
| 6,601,034 | B1 | 7/2003 | Honarvar et al. | |
| 6,611,822 | B1 | 8/2003 | Beams et al. | |
| 6,643,633 | B2 | 11/2003 | Chau et al. | |
| 6,711,582 | B2 | 3/2004 | Aldridge et al. | |
| 6,751,646 | B1 | 6/2004 | Chow et al. | |
| 6,785,675 | B1 * | 8/2004 | Graves et al. | 707/4 |
| 2002/0023091 | A1 * | 2/2002 | Silberberg et al. | 707/103 Y |
| 2004/0103088 | A1 * | 5/2004 | Cragun et al. | 707/3 |

FOREIGN PATENT DOCUMENTS

WO   WO 02/35395   *   5/2002

OTHER PUBLICATIONS

Jerry Kiernan and Michael J. Carey, Extending SQL-92 for OODB access: Design and Implementation Experience.*
Liu et al., "An Adaptive Approach to Query Mediation Across Heterogeneous Information Sources", *IEEE*, Jun. 19, 1996, pp. 144-156, XP010200757.
Wang et al., "Versatile: A Scaleable CORBA-based System for Integrating Distributed Date", *IEEE International Conference on Intelligent Processing Systems*, Oct. 28, 1997, pp. 1589-1593, xp010276314.
Anonymous, "Java Management Extensions Instrumentation and Agent Specification, v1.0", Internet Article, Online!, Feb. 27, 2004, pp. 1-164, XP002363702.

* cited by examiner

*Primary Examiner*—Khanh B Pham
*Assistant Examiner*—Andalib F Lodhi
(74) *Attorney, Agent, or Firm*—Pillsbury Winthrop Shaw Pittman LLP

(57) ABSTRACT

This disclosure provides a system and method for providing a relational application domain model. In one embodiment, the system is operable to or includes software that is operable to receive a structured query language (SQL) query for one or more services by at least a first of a plurality of resources. The software may be further operable to convert the SQL query into an object-oriented request compatible with at least the first resource and execute the object-oriented request at at least the first resource.

25 Claims, 2 Drawing Sheets

SYSTEM AND METHOD FOR PROVIDING A RELATIONAL APPLICATION DOMAIN MODEL

TECHNICAL FIELD

This disclosure generally relates to distributed resourcing and, more specifically, to a system and method for providing a relational application domain model.

BACKGROUND

Conventional distributed applications typically include one or more communication protocols between various components physically located on separate machines or logically located in remote segments or environments. Usually there are two logical pipes of communication: a data pipe that facilitates data exchange between applications and a metadata pipe communicating type information associated with the communicated data. The protocols facilitate or manage this exchange of the data and metadata. At the highest level, a protocol may be considered one form of an API (or Application Programming Interface). Typical APIs are difficult to modify to fit changing needs or applications and are often difficult to enforce in a distributed team environment. For example, various APIs may be defined and implemented during a long period of time by various teams across an enterprise on multiple platforms. Indeed, many enterprises include or utilize a plurality of different APIs to exchange metadata with various agents in order to traverse a hierarchy of managed resources.

SUMMARY

This disclosure provides a system and method for providing a relational application domain model. In one embodiment, the system is operable to or includes software that is operable to receive a structured query language (SQL) query for one or more services by at least a first of a plurality of resources. The system or software may be further operable to convert the SQL query into an object-oriented request compatible with at least the first resource and execute the object-oriented request at at least the first resource. The details of one or more embodiments of the disclosure are set forth in the accompanying drawings and the description below. Particular features, objects, and advantages of the disclosure will be apparent from the description and drawings and from the claims.

DETAILED DESCRIPTION

Figure 1:
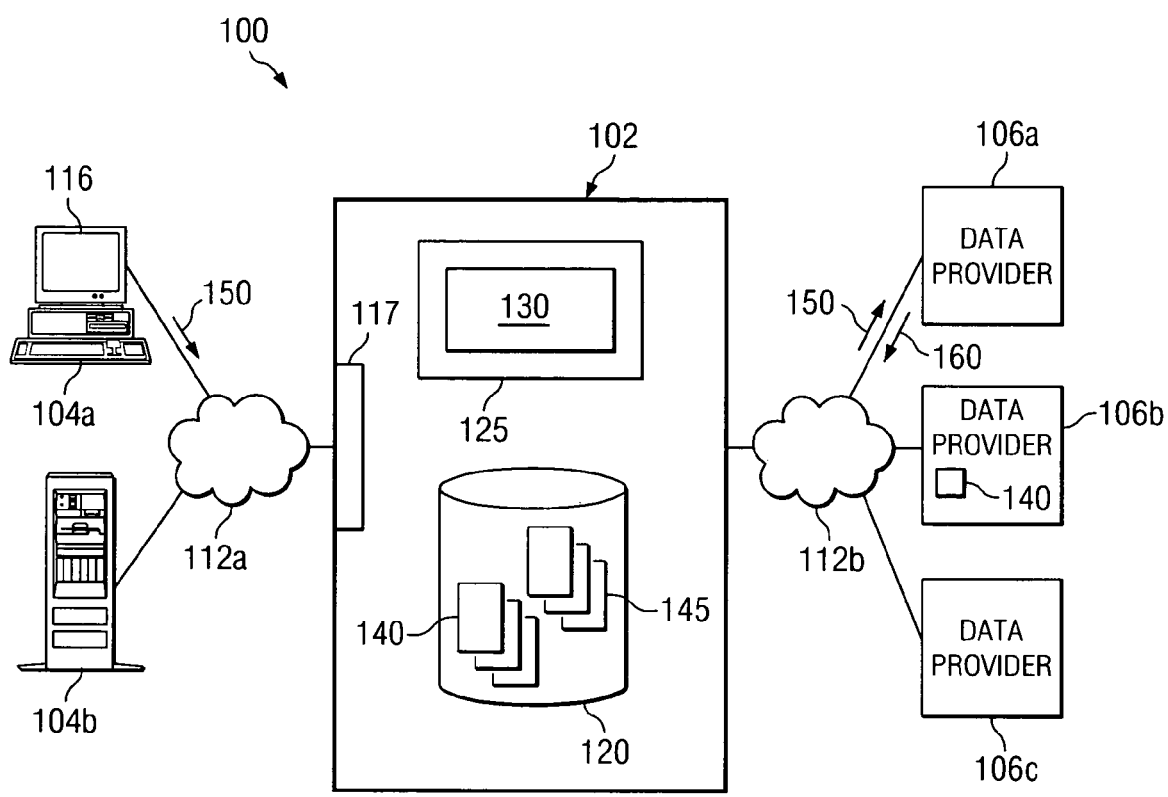
FIG. 1 illustrates a environment that provides a relational application domain model in accordance with one embodiment of the present disclosure.

FIG. 1 illustrates a distributed application environment 100 for at least a portion of enterprise or data processing environment in accordance with one embodiment of the present disclosure. At a high level, environment 100 represents a relational application domain model and includes or is communicably coupled with some or all of server 102, one or more clients 104, and a plurality of data resources 106. For example, distributed application environment 100 may include server 102 that is operable to receive a Structured Query Language (SQL) query 150 from a user of one of the clients 104, convert query 150 to an object-oriented request associated with at least one of the data resources 106 referencing or storing data 160 requested by query 150, and execute the object-oriented request on the appropriate resource 106. Therefore, distributed application environment 100 may provide substantially uniform access to metadata exposed by agents associated with data resources 106. Put another way, server 102 may provide a SQL interface or other Application Programming Interface (API) for applications executing on clients 104 to resources 106. As used herein, "SQL" describes or includes any of the plurality of versions of the SQL relational database query and manipulation language such as, for example, SEQUEL, ANSI SQL, any other proprietary or public variant of SQL, or other suitable or generic database query language (XML). Distributed application environment 100 may be a distributed client/server system that allows users of clients 104 to submit queries 150 for execution on any of the plurality of external resources 106. But environment 100 may be a standalone computing environment or any other suitable environment, such as an administrator accessing data stored on server 102, without departing from the scope of this disclosure. For example, resources 106 may be distributed across a plurality of virtual or logical partitions resident on server 102. The term "dynamically," as used herein, generally means that certain processing is determined, at least in part, at run-time based on one or more variables. The term "automatically," as used herein, generally means that the appropriate processing is substantially performed by at least part of distributed application environment 100. It should be understood that "automatically" further contemplates any suitable administrator or other user interaction with environment 100 without departing from the scope of this disclosure.

Returning to the illustrated embodiment, server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes transformation agents 140 and transformation policies 145, but it may also include any other appropriate data such as a job history, a security or audit log, print or other reporting files, HTML files or templates, and others.

Each transformation agent 140 is any hardware, software, firmware, or other component associated with at least one data resource 106 and operable to convert query 150 to an object-oriented form compatible with the particular one or more resources 106. Each agent may be further operable to call or execute Business Logic Layer (BLL) or Data Access Layer (DAL) logic as appropriate. For example, agent 140 may comprise an API implemented through a dynamic linked library (DLL), a daemon, an object, or other such software module. Each transformation agent 140 may be written or described in any appropriate computer language including C, C++, C#, Java, J#, Visual Basic, assembler, Perl, any suitable version of 4GL, and others or any combination thereof. It will be understood that while each transformation agent 140 is illustrated in FIG. 1 as a single multi-tasked module, the features and functionality performed by this engine may be performed by multiple modules such as, for example, a plurality of objects within a particular agent 140. Further, agents 140 may be collectively stored in one file or library or distributed across a plurality of files or libraries without departing from the scope of the disclosure. While illustrated as residing on server 102, each agent 140 may be located or executed on the respective data resource 106. In certain embodiments, transformation agent 140 may convert query 150 to an object-oriented framework based one or more transformation policies 145. As used herein, "each" means one or all of a particular subset as appropriate.

Transformation policies 145 include any parameters, variables, mappings, algorithms, instructions, rules or other policies for dynamically converting from SQL to an object-oriented framework. Moreover, transformation policies 145 may also define or implement various relationships between transformation agents 140 or other processes associated with data resources 106. For example, transformation policies 145 may include an enterprise-wide or a default mapping policy 145, thereby providing a uniform map from SQL to the appropriate resource 106. In another example, transformation policies 145 may store a plurality of individual API transformation policies 145, each of which may be associated with an agent 140 or resource 106 and allow the particular agent to customize query 150 for the particular resource 106. In certain embodiments, transformation policies 145 allow server 102 to quickly adapt to changing resources 106 and to provide a standard or substantially uniform interface to clients 104. In one embodiment, transformation policies 145 may comprise one or more tables stored in a relational database described in terms of SQL statements or scripts. In another embodiment, transformation policies 145 may store or define various data structures as text files, extensible Markup Language (XML) documents, Virtual Storage Access Method (VSAM) files, flat files, Btrieve files, comma-separated-value (CSV) files, internal variables, or one or more libraries. While illustrated separately, in a further embodiment, one or more transformation policies 145 may be rules or variables internal to certain transformation agents 140. In short, transformation policies 145 may comprise one variable, table, or file or a plurality of variables, tables, or files stored on one computer or across a plurality of computers in any appropriate format. Moreover, all or a portion of transformation policies 145 may be local or remote to server 102 without departing from the scope of this disclosure and store any type of appropriate data.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes parsing engine 130, which performs at least a portion of the analysis or other processing of incoming SQL queries 150.

Parsing engine 130 could include any hardware, software, firmware, or combination thereof operable to receive queries 150 that are compatible with SQL, dynamically convert queries 150 to an object-oriented framework associated with one or more data resources 106, and automatically execute converted queries 150 on the resources 106 to gather requested data 160. For example, parsing engine 130 may receive a query 150 that is in SQL and output a copy of query 150 as one or more POJOs (Plain Old Java Objects). Parsing engine 130 may be further operable to aggregate the various data 160 received from a plurality of data resources 106. In certain embodiments, parsing engine 130 may include, reference, or execute one or more transformation agents 140 associated with resources 106. In other words, parsing engine 130 and transformation agents 140 may be used interchangeably as appropriate without departing from the scope of the disclosure. Parsing engine 130 may be written or described in any appropriate computer language including C, C++, C#, Java, J#, Visual Basic, assembler, Perl, any suitable version of 4GL, and others or any combination thereof. It will be understood that while parsing engine 130 is illustrated in FIG. 1 as a single multi-tasked module, the features and functionality performed by this engine may be performed by multiple modules such as, for example, one or more agents 140. For example, parsing engine 130 may facilitate interoperability among various transformation agents 140 and transparency to client 104. Further, while illustrated as internal to server 102, one or more processes associated with parsing engine 130 may be stored, referenced, or executed remotely. Moreover, parsing engine 130 may be a child or sub-module of another software module (not illustrated) without departing from the scope of this disclosure. In one embodiment, parsing engine 130 may be referenced by or communicably coupled with applications executing on client 104.

Server 102 may also include interface 117 for communicating with other computer systems, such as client 104, over network 112 in a client-server or other distributed environment. In certain embodiments, server 102 receives queries 150 from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of queries 150 and results 160. In other words, network 112 encompasses any internal or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a GUI 116, a CLI (Command Line Interface), or other user interface. At a high level, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 102. Further, "client 104," "recipient," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review jobs 150 via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. For example, GUI 116 may be a front-end of an application executing on client 104 that is operable to submit SQL queries 150 to one or more data resources 106 through parsing engine 130. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Netscape Navigator) and return the appropriate HTML or XML responses using network 112. For example, server 102 may receive a job submission or data query 150 from client 104 using the web browser and then execute the parsed query in the appropriate one or more operating resources 106.

Environment 100 includes, references, or is communicably coupled with a plurality of data resources 106. Data resource 106 typically comprises a distributed application, data repository, web server, job queue, media service, file system agent, or any other target machine or process operable to store, retrieve, generate, or otherwise identify and collect data based on a received query 150. For example, resource 106 may include a plurality of services operable to communicate requested data 160 to data consuming services on client 104 based on queries 150 transformed by parsing engine 130. As illustrated by second resource 106b, resources 106 may also include an enterprise agent 140 residing on the target machine. It will be understood that the target machine or process may be remote or on-site; further, the target machine may represent a separate process or repository residing on server 102 without departing from the scope of this disclosure. In other words, data resource 106 is any module or component that receives queries 150 and retrieves data 160, normally (but not always) residing on the target machine, based on received query 150. In certain embodiments, some or all data resources 106 are each associated with an API or other object-oriented framework. Of course, two or more resources 106 may share the same API or may be compatible with identical frameworks without departing from the scope of the disclosure. Moreover, each data resource 106 may include one server or other computer or may be distributed across a plurality of computers. In certain embodiments, retrieved or communicated data 160 is in tabular format. In other embodiments, data 160 may be in XML format. Regardless of the particular format, data 160 is often operable to be normalized or self-describing. Once the data has been gathered, data resource 106 may communicate data 160 to server 102 or server 102 may retrieve data 160 from data resource 106, as appropriate.

In one aspect of operation, server 102 receives a SQL query 150 from one of the communicably coupled clients 104. Parsing engine 130 parses query 150 into one or fields, parameters, or other elements to identify the requested data or other services and determines the location of the request services. For example, parsing engine 130 may identify and collect one or more fields requested by SQL query 150. Moreover, parsing engine 130 may identify a requested sort order, filter, limit, or other properties or parameters of query 150. In this example, these fields may be processed as an array of strings. Once query 150 is parsed into the appropriate fields or other elements, parsing engine 130 identifies the one or more data resources 106, based on the determined location, and the appropriate transformation agents 140 that are compatible with the identified resources 106. In certain embodiments, parsing engine may load or instantiate the identified transformation agents 140, thereby possibly allowing quicker conversion of SQL query 150 into an object-oriented request. Parsing engine 130 may also identify, load, or otherwise process the appropriate transformation policies 145 based on the identified agents 140. Next, parsing engine 130 maps, converts, or otherwise transforms SQL query 150 into one or more object-oriented requests in one or more object-oriented frameworks, each framework compatible with at least one of the identified resources 106. Parsing engine then uses these object-oriented requests to obtain the requested data or other services from resources 106. For example, parsing 130 may use an API associated with the one or more resources 106 to execute the object-oriented requests. In certain embodiments, at least a subset of the data resources 106 return data 160 in an object-oriented format operable to generate tabular results represented by tuples or name-value pairs. For example, a first data resource 106 may communicate results 160 as a cache of data objects that are XML-enabled. These tabular results 160 may implement any or all of tables, views, relations, constraints, and other database tabular characteristics. Moreover, tabular results 160 may provide built-in data filtering, sorting, computation, transformation, aggregation, and other processes without departing from the scope of this disclosure.

Figure 2:
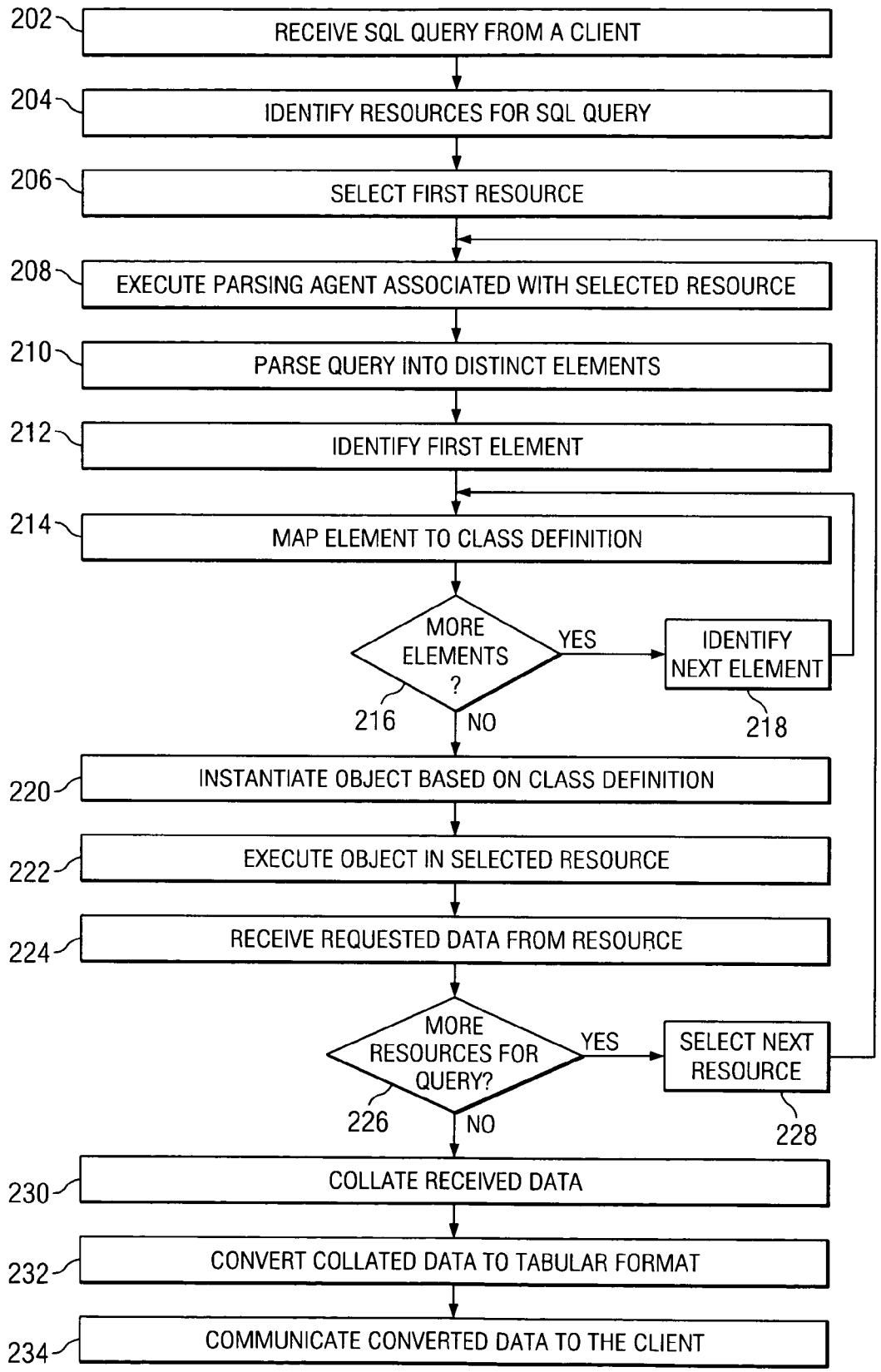
FIG. 2 is a flowchart illustrating an example method for processing a client request through a relational application domain model in accordance with one embodiment of the present disclosure

FIG. 2 is a flowchart illustrating example method 200 for processing a client request or other SQL query 150 through a relational application domain model through parsing engine 130 in accordance with one embodiment of the present disclosure. Generally, method 200 describes one example technique for parsing engine 130 to convert standardized queries 150 to object-oriented queries or commands compatible with one or more data resources 106. It will be understood that method 200 is for illustration purposes only and these or similar techniques may be performed at any appropriate time, including concurrently, individually, or in combination. The following descriptions will focus on the operation of parsing engine 130 in performing this method. But, server 102 contemplates using any appropriate combination and arrangement of logical elements implementing some or all of the described functionality.

Method 200 begins at step 202, where server 102 receives a SQL query 150 from client 104, often via network 112. Next, parsing engine 130 identifies one or more data resources 106 associated with the received SQL query 150 at step 204. For example, query 150 may request data that resides on a first data resource 106a and a second data resource 106b. In this example, the requested data may reside on multiple resources 106 because first data resource 106 is a production instance and second data resource 106 is an archive instance, first resource 106 includes one requested table and second resource 106 includes another requested table, or because of any other reason. Returning to the illustration, parsing engine 130 selects the first of the identified resources 106 at step 206. Once selected, parsing engine 130 identifies, locates, or otherwise loads transformation agent 140 associated with the particular resource 106 at step 208. For example, if the selected first resource 106 is a mainframe DBMS environment, then parsing engine 130 may load the particular transformation agent 140 that is compatible with API to the mainframe DBMS environment. In another example, if the selected first resource 106a is a job scheduler, then parsing engine 130 may load a transformation agent 140 operable to generate objects that may execute on or in the job scheduling resource 106a. Next, parsing engine 130 parses the received query 150 into one or more distinct elements at step 210. As described above, these elements may be data fields, sort orders, filters, or any other data characteristic or parameter of query 150.

Once query 150 is suitably parsed, parsing engine 130 identifies the first of the various elements at step 212. Once identified, parsing engine 130 maps the identified element to an appropriate class definition at step 214. This class definition may include a class, inheritance, method, or property definition without departing from the scope of the disclosure. In certain embodiments, this mapping may be based on one or more transformation policies 145. For example, parsing engine 130 may load one or more policies 145 based on the identified data resources 106 (or agent 140) and locate a particular mapping entry using the identified query element. At decisional step 216, parsing engine 130 determines if there are remaining unprocessed elements in parsed query 150. If there are, and parsing engine 130 identifies the next element at step 218 and execution returns to step 214.

Once there no more elements at decisional step 216, parsing engine 130 instantiates one or more objects based on the mapped class definitions in step 220. At step 222, parsing engine 130 executes the instantiated object on the selected resource 106. It will be understood that execution of the particular object may include executing object using processor 125, thereby requesting information from resource 106, communicating the instantiated object to the particular resource 106 via a resident agent 140, creating and executing the object on resource 106, or any other appropriate execution. Next, parsing engine 130 receives, requests, or otherwise obtains certain data 160 from the selected resource 106 at step 224. Parsing engine 130 then determines if there are more resources 106 associated with received SQL query 150 at decisional step 226. If there are more resources 106, then parsing engine 130 selects the next resource 106 at step 228 and execution returns to step 208.

Once the SQL query 150 has been suitably processed, then parsing engine 130 may collate or otherwise aggregate the received data 160 at step 230. For example, parsing engine 130 may cache data 160 as it is received at step 224. In another example, parsing engine 130 may generate a temporary table for storing data 160 upon receiving SQL query 150 and add rows to the table as resources 106 communicate the requested data 160. In certain embodiments, parsing engine 130 then converts data 160, whether collated or not, to a tabular format at step 232. For example, this may allow the result of queries 150 to be normalized and expressed as a single well-defined data type based on a relational concept of a table. In other words, received data 160 may be self descriptive and may support a number well-defined operations including filtering (vertically and horizontally), sorting, and iterating. Moreover, in certain embodiments, received data 160 may be immutable or uniform across at least a subset of managed resources or resources 106. Once data 160 has been appropriately processed, server 102 may communicate data 160 to client 104 at step 234. It will be understood that this communication may involve any other suitable processing including generation of web pages and others. Moreover, it will be understood that requesting client 104 and the receiving client 104 may or may not be the same user or computer.

The preceding flowchart and accompanying description illustrate exemplary method 200. In short, environment 100 contemplates using any suitable technique for performing these and other tasks. Accordingly, many of the steps in this flowchart may take place simultaneously and/or in different orders than as shown. Moreover, environment 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. For example, parsing engine 130 and the example plurality of agents 140 may collectively be considered a super-API operable to accommodate a plurality of applications, data resources 106, and clients 104 and provide a single representation of metadata associated with data 160. Accordingly, the above description of example embodiments does not define or constrain this disclosure. Other changes, substitutions, and alterations are also possible without departing from the spirit and scope of this disclosure.

What is claimed is:

1. A computer readable medium containing computer-executable instructions for modeling a relational application domain, wherein the instructions are configured to cause a processing device to:
   receive a structured query language (SQL) query from a client, wherein the SQL query includes a request for data referenced or stored on a plurality of data resources, wherein each of the plurality of data resources are associated with a respective object-oriented framework;
   convert the SQL query into a plurality of object-oriented requests using one or more transformation policies, wherein the one or more transformation policies include at least a mapping policy that provides a uniform map for converting the SQL query into an object oriented format compatible with the object-oriented frameworks respectively associated with the plurality of data resources, wherein to convert the SQL query into the plurality of object-oriented requests, the instructions further cause the processing device to:
   map one or more elements of the SQL query to a plurality of class definitions using the mapping policy, wherein the plurality of class definitions are respectively associated with the object-oriented frameworks of the plurality of data resources; and
   instantiate the plurality of object-oriented requests based on the mapped class definitions;
   execute the plurality of object-oriented requests on each of the plurality of data resources to retrieve the requested data from each of the plurality of data resources, wherein the plurality of data resources return the requested data in an object-oriented format compatible with the respective object-oriented framework;
   aggregate the data returned by the plurality of data resources in response to the object oriented requests; and
   communicate the aggregated data to the client that submitted the SQL query.

2. The computer readable medium of claim 1, wherein the instructions that cause the processing device to execute the plurality of object-oriented requests further cause the processing device to:
   communicate the plurality of object-oriented requests to the plurality of data resources; and
   request execution of the communicated object-oriented requests on the plurality of data resources.

3. The computer readable medium of claim 1, wherein the instructions that cause the processing device to convert the SQL query into the plurality of object-oriented requests further cause the processing device to parse the SQL query into the one or more elements, wherein the one or more parsed elements include data characteristics and parameters of the SQL query.

4. The computer readable medium of claim 1, wherein the plurality of data resources are remote from the client.

5. The computer readable medium of claim 1, wherein the SQL query includes an eXtensible Markup Language (XML) query.

6. The computer readable medium of claim 1, wherein the SQL query includes a select statement or an execute statement.

7. The computer readable medium of claim 1, wherein the plurality of object-oriented requests include a plurality of Plain Old Java Objects (POJOs) respectively configured to be executed on the plurality of data resources to gather the requested data from the plurality of data resources.

8. The computer readable medium of claim 7, wherein the plurality of object-oriented requests executed on the plurality of data resources each include one or more object-oriented queries or object-oriented commands compatible with the object-oriented framework of the respective data resource.

9. A method for modeling a relational application domain, comprising:
   receiving a structured query language (SQL) query from a client, wherein the SQL query includes a request for data referenced or stored on a plurality of data resources, wherein each of the plurality of data resources are associated with a respective object-oriented framework;
   converting the SQL query into a plurality of object-oriented requests using one or more transformation policies, wherein the one or more transformation policies include at least a mapping policy that provides a uniform map for converting the SQL query into an object oriented format compatible with the object-oriented frameworks respectively associated with the plurality of data resources, wherein converting the SQL query into the plurality of object-oriented requests further includes:
   mapping one or more elements of the SQL query to a plurality of class definitions using the mapping policy, wherein the plurality of class definitions are respectively associated with the object-oriented frameworks of the plurality of data resources; and
   instantiating the plurality of object-oriented requests based on the mapped class definitions;
   executing the plurality of object-oriented requests on each of the plurality of data resources to retrieve the requested data from each of the plurality of data resources, wherein the plurality of data resources return the requested data in an object-oriented format compatible with the respective object-oriented framework;
   aggregating the data returned by the plurality of data resources in response to the object-oriented requests; and
   communicating the aggregated data to the client that submitted the SQL query.

10. The method of claim 9, wherein executing the plurality of object-oriented requests further includes:
    communicating the plurality of object-oriented requests to the plurality of data resources; and
    requesting execution of the communicated object-oriented requests on the plurality of data resources.

11. The method of claim 9, wherein converting the SQL query into the plurality of object-oriented requests further includes parsing the SQL query into the one or more elements, wherein the one or more parsed elements include data characteristics and parameters of the SQL query.

12. The method of claim 9, wherein the plurality of data resources are remote from the client.

13. The method of claim 9, wherein the SQL query includes an eXtensible Markup Language (XML) query.

14. The method of claim 9, wherein the SQL query includes a select statement an execute statement.

15. The method of claim 9, wherein the plurality of object-oriented requests include a plurality of Plain Old Java Objects (POJOs) respectively configured to be executed on the plurality of data resources to gather the requested data from the plurality of data resources.

16. The method of claim 15, wherein the plurality of object-oriented requests executed on the plurality of data resources each include one or more object-oriented queries or object-oriented commands compatible with the object-oriented framework of the respective data resource.

17. A system for modeling a relational application domain, comprising one or more processors configured to:

receive a structured query language (SQL) query from a client, wherein the SQL query includes a request for data referenced or stored on a plurality of data resources, wherein each of the plurality of data resources are associated with a respective object-oriented framework;

convert the SQL query into a plurality of object-oriented requests using one or more transformation policies, wherein the one or more transformation policies include at least a mapping policy that provides a uniform map for converting the SQL query into an object oriented format compatible with the object-oriented frameworks respectively associated with the plurality of data resources, wherein to convert the SQL query into the plurality of object-oriented requests, the one or more processors are further configured to:

map one or more elements of the SQL query to a plurality of class definitions using the mapping policy, wherein the plurality of class definitions are respectively associated with the object-oriented frameworks of the plurality of data resources; and instantiate the plurality of object-oriented requests based on the mapped class definitions;

execute the plurality of object-oriented requests on each of the plurality of data resources to retrieve the requested data from each of the plurality of resources, wherein the plurality of data resources return the requested data in an object-oriented format compatible with the respective object-oriented framework;

aggregate the data returned by the plurality of data resources in response to the object oriented requests; and communicate the aggregated data to the client that submitted the SQL query.

18. The system of claim 17, wherein the one or more processors are further configured to execute the plurality of object-oriented requests by:

communicating the plurality of object-oriented requests to the plurality of data resources; and requesting execution of the communicated object-oriented requests on the plurality of data resources.

19. The system of claim 17, wherein the one or more processors are further configured to convert the SQL query into the plurality of object-oriented requests by parsing the SQL query into the one or more elements, wherein the one or more parsed elements include data characteristics and parameters of the SQL query.

20. The system of claim 17, wherein the plurality of data resources are remote from the client.

21. The system of claim 17, further comprising:

a plurality of agents configured to convert the SQL query into the plurality of object-oriented requests based on compatibility with the object-oriented frameworks respectively associated each of the plurality of data resources.

22. The system of claim 17, wherein the SQL query includes an eXtensible Markup Language (XML) query.

23. The system of claim 17, wherein the SQL query includes a select statement or an execute statement.

24. The system of claim 17, wherein the plurality of object-oriented requests include a plurality of Plain Old Java Objects (POJOs) respectively configured to be executed on the plurality of data resources to gather the requested data from the plurality of data resources.

25. The system of claim 24, wherein the plurality of object-oriented requests executed on the plurality of data resources each include one or more object-oriented queries or object-oriented commands compatible with the object-oriented framework of the respective data resource.

* * * * *